Figure 1:
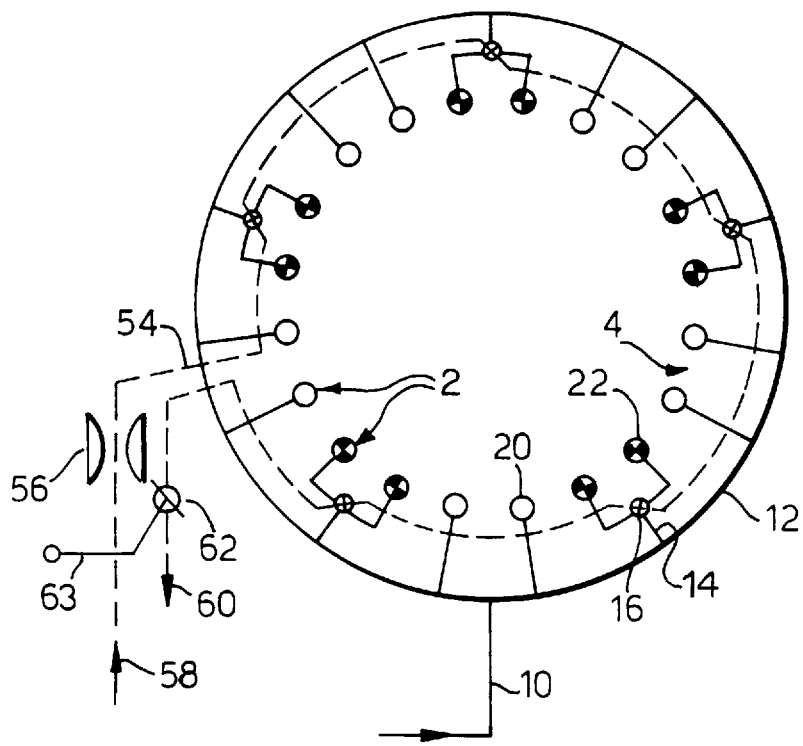

United States Patent [19]
Munro

[11] Patent Number: 5,884,483
[45] Date of Patent: Mar. 23, 1999

[54] FUEL SYSTEM FOR A GAS TURBINE ENGINE

[75] Inventor: Kevin M Munro, Bristol, Great Britain

[73] Assignee: Rolls-Royce plc, London, England

[21] Appl. No.: 834,433

[22] Filed: Apr. 16, 1997

[30] Foreign Application Priority Data

Apr. 18, 1996 [GB] United Kingdom ............... 9608027

[51] Int. Cl.⁶ .................................................. F02C 7/228
[52] U.S. Cl. ............................................. 60/739; 60/734
[58] Field of Search ........................ 60/734, 739, 740, 60/746

[56] References Cited

U.S. PATENT DOCUMENTS

| | | | |
|---|---|---|---|
| 4,027,473 | 6/1977 | Baker | 60/739 |
| 4,305,255 | 12/1981 | Davies et al. | |
| 4,817,389 | 4/1989 | Holladay et al. | 60/739 |
| 4,920,740 | 5/1990 | Shekleton | 60/739 |
| 5,289,685 | 3/1994 | Hoffa | |
| 5,339,636 | 8/1994 | Donnelly et al. | 60/739 |
| 5,442,922 | 8/1995 | Dyer et al. | 60/739 |

FOREIGN PATENT DOCUMENTS

A-1 437 397  5/1976  United Kingdom.

*Primary Examiner*—Louis J. Casaregola
*Attorney, Agent, or Firm*—Oliff & Berridge, PLC

[57] ABSTRACT

A staged fuel system for a gas turbine engine in which the main burners are supplied with fuel through fluid pressure actuated, servo-controlled valves. All pilot and main burners are supplied from a single manifold. However, fuel flow to the main burners is controlled by the servo-valves which are controlled by pressure in a servo-manifold fed with fuel tapped from a high pressure region of the fuel system. Thus, a simple variable control valve on the outlet of the servo-manifold is able to control fuel staging.

6 Claims, 2 Drawing Sheets

FUEL SYSTEM FOR A GAS TURBINE ENGINE

The invention relates to a fuel system for a gas turbine engine.

In particular the invention concerns a fuel system of the kind sometimes referred to as a staged fuel system in which fuel injectors or burners are, at least notionally, arranged in several groups. At least one of these groups receiving fuel continuously while the remaining groups receive fuel in a staged manner according to engine power demand.

Staged fuel systems of the kind of present interest are associated most commonly, but not exclusively, with annular combustors. However, such annular combustors may be of the single annular type, or the double annular type and in the latter instance may be axially staged or radially staged or a combination. Typically in single annular combustors a multiplicity of fuel injector means are spaced apart circumferentially around the combustor at a single radius. For staged operation these injector means may be notionally grouped in a variety of patterns; for example in a low power operating condition fuel may be supplied to alternate injector means, or every third or fourth injector an so on, or still further they may be grouped together in multiples as is already known in the art. It has to be mentioned here also that the term "injector means" or "injector" or "burner" is not intended to be construed narrowly, rather it is to be understood to include any of the presently known means of introducing fuel or fuel/air mixture into a continuous burn combustion chamber.

The objectives and principles of staged combustion processes, for example for the purpose of reduced production of hydro-carbons (HC), carbon monoxide (CO) and oxides of nitrogen ($NO_x$) are well documented in prior art literature. No further explanation or description will be set forth hereinafter as the skilled reader will already be familiar with such literature.

In such staged fuel systems, during periods of low-power burning the non-contributing injectors or burners will be subject to heat soak so that residual fuel will be vaporised with the virtually inevitable result that trapped fuel would be reduced to a deposit capable of blocking the fuel flow passage. Thus, considerable trouble is taken in the design of the fuel systems to avoid trapped fuel by purging unused burners and even their supply manifold. Double manifold systems incur an unavoidable weight penalty and delay in re-filling the purged manifold when high power operation is demanded. The alternative of a single manifold requires valve means for controlling fuel supply to the non-continuously used injectors. These valves must remain capable of operation after prolonged period of heat soak but, preferably, should remain primed ready for virtually instantaneous operation. The present invention is intended to address these problems.

According to the present invention there is provided a fuel system for a gas turbine engine comprising a multiplicity of fuel injector means, a fuel supply manifold with which all fuel injectors means are in fuel supply communication, some of the fuel injector means being in free communication with the supply manifold to receive fuel, and further ones of the fuel injector means being connected to the fuel manifold through valve means selectively operable to stem the flow of fuel, said valve means comprising servo-operated valve means responsive to a high fuel supply demand.

Preferably, the valve means comprises a fuel system wherein the valve means comprises a plurality of servo-operated valves interconnected by a fluid carrying servo-pressure manifold.

Furthermore, it is preferred for the servo-pressure manifold to carry a continuous flow of fuel diverted from the normal fuel supply system to the fuel injector means.

Figure 2:
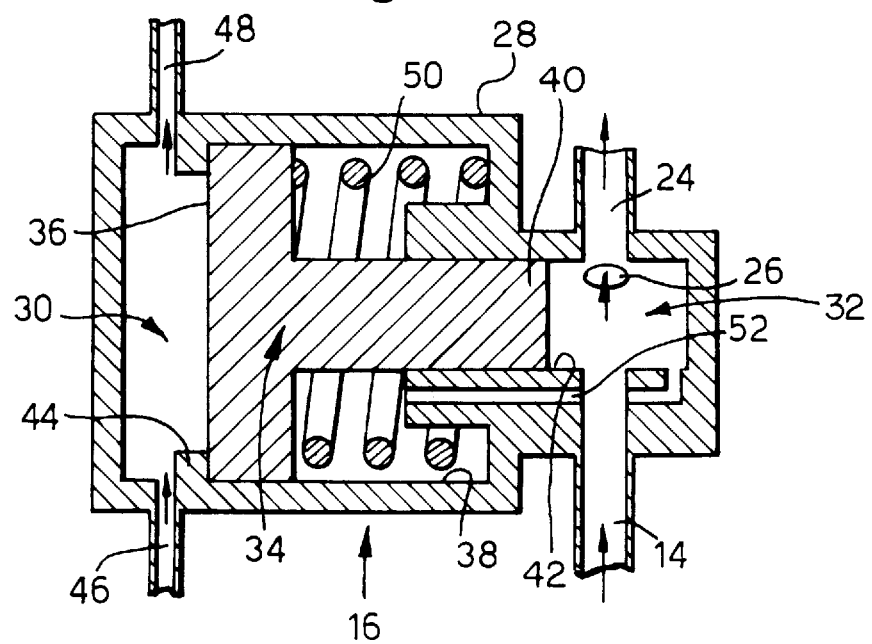
Figure 3:
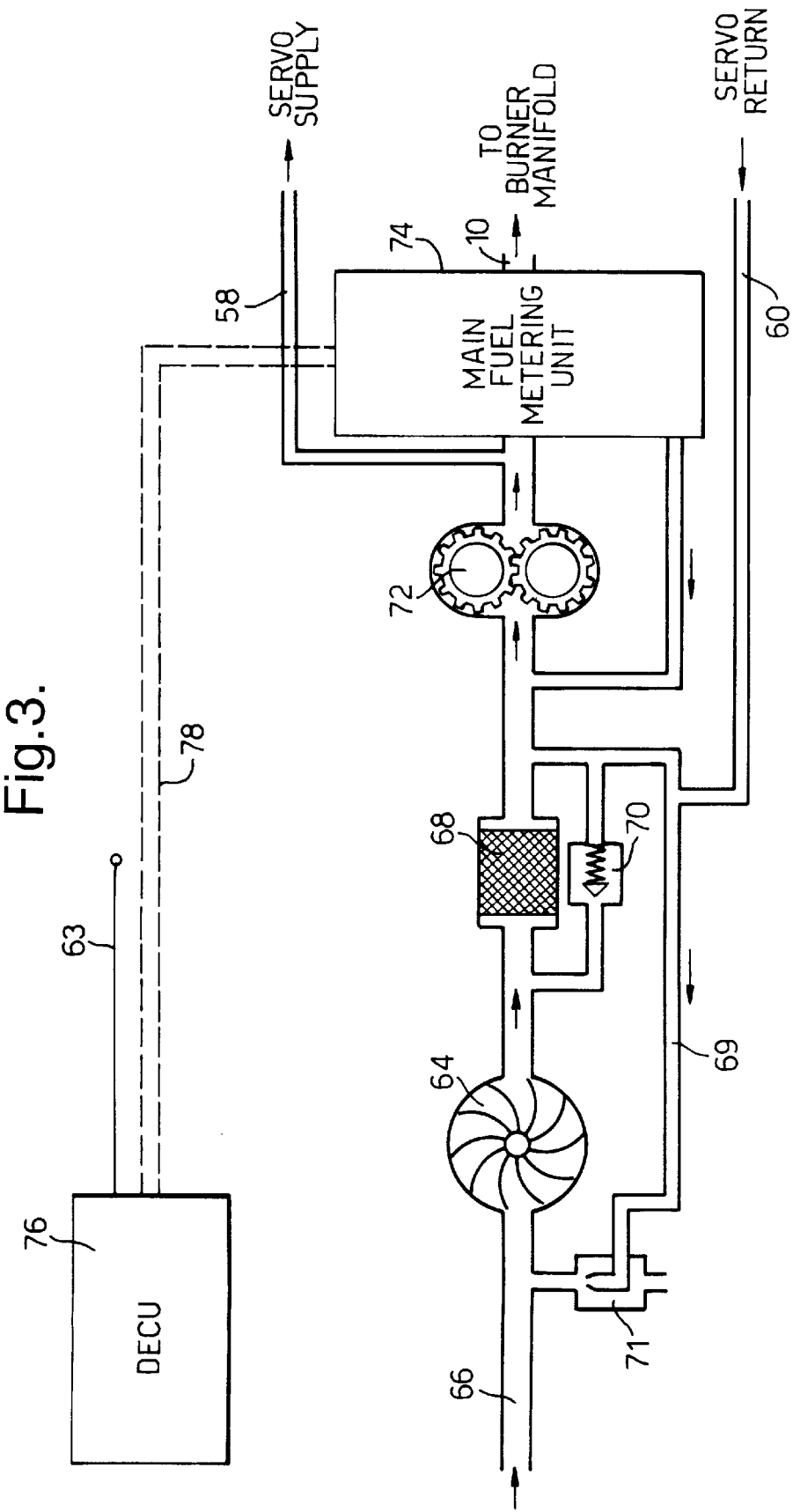

The invention and how it may be carried into practice will now be described in greater detail with particular reference to an embodiment illustrated in the accompanying drawings, in which:

FIG. 1 is a schematic illustration of the fuel supply manifold, fuel injector means and servo-valve system of a staged fuel system according to the invention, FIG. 2 illustrates a sectioned view of a servo-valve for controlling fuel flow to a staged fuel injector, and FIG. 3 is a schematic diagram showing how the arrangement of FIG. 1 might be incorporated in a typical, known fuel system.

In FIG. 1 twenty fuel injector means 2 are circumferentially spaced apart around the interior of an annular combustion chamber 4. A metered fuel supply (see FIG. 3) is delivered at 10 to a fuel manifold 12. Normally the fuel manifold, as in this embodiment, extends circumferentially around the exterior of the combustion chamber casing, ie it is located in the bypass duct of a bypass engine, and fuel is delivered to each of the fuel injector means 2 through a radial, inwardly directed spur 14.

The particular fuel system is of the kind known generally as a staged system, that is, a system in which the totality of fuel injector means are divided into two groups, at least, termed pilot and main burners. In one group the pilot burners 20 are operated continuously and when necessary, such as during high power requirements, these are supplemented by the main burners 22 of the second group to increase the flow of fuel into the combustion chamber. In the drawing the pilot burners 20 are denoted by plain, circular discs and the main burners 22 by quartered discs. As shown, in the illustrated system, the main burners 22 are grouped in pairs, and receive fuel through outlets 24,26 from a servo-controlled fuel supply valve 16 connected to a fuel spur 14.

FIG. 2 illustrates a servo-controlled fuel supply valve generally indicated at 16, including of a hollow valve body 28 the interior of which is divided into a plurality of chambers 30,32 separated by a servo-piston 34. The chamber 30 on one side of the piston 34 acts as a servo-chamber to exert pressure on an end face 36 of the piston 34. The piston 34 is arranged for axial movement within a first bore 38 formed within the valve body 28. Opposite the face 36 the piston is formed within an extension 40 of smaller diameter, than the face 36, which is a sliding fit within a bore 42 of the second chamber 32. The stroke of piston 34 is limited in the direction of servo-chamber 30 by an annular stop 44 which defines a minimum volume in the chamber and maintains uninhibited flow through the chamber between a servo-flow inlet 46 and a servo-flow outlet 48. The piston 34 is biased in this direction by a spring 50 in the interior of the valve behind the piston. At the opposite end of the valve 16 the fuel supply chamber 32 has a fuel inlet 14 and two fuel outlets 24,26, one to each of the pair of main burners. The piston extension 40 towards the other end of the piston stroke is effective to cut-off communication between the fuel inlet 14 and the two outlets 24,26 thus stemming the supply of fuel to the main burners 22. The enclosed space within the valve body and behind piston 34, the volume of which space varies in accordance with movement of the piston, is vented into the fuel path through a by-pass passage 52.

It will be apparent from FIG. 1 that there are a plurality of servo-operated fuel valves 16 distributed around the combustion chamber. The servo-flow inlets 46 and outlets 48 of these valves are connected in series by a closed-loop servo manifold 54. This manifold 54 has an inlet connected through a flow restrictor 56 to a fuel feed 58 tapped from a high pressure fuel pump outlet, and a servo-return 60 through a variable valve 62 to a point in the fuel system of relatively low pressure. The valve 62 may be a solenoid valve electrically actuated by a signal on control line 63. Preferably, the servo-manifold, servo-valves and associated pipework is also located within the bypass duct.

The diagram of FIG. 3 shows how this system may be incorporated into a typical fuel system of a gas turbine engine. The major elements of the fuel system comprise a first stage, or low pressure, fuel pump 64 which draws fuel through an inlet 66 from a fuel tank (not shown). Fuel from pump 64 is passed through a filter 68 which has a parallel, automatic relief valve 70 in the event of the filter becoming blocked. There is also a return path 69 from the outlet of filter 68 via an ejector pump 71 to the inlet of pump 64. The main flow of fuel from filter 68 is passed directly to the inlet of a high pressure pump 72 and hence to a fuel metering unit 74. A digital engine control unit (DECU) 76 produces electrical signals on signal lines 78 to control operation of the metering unit 74 in accordance with various inputs (not shown) such as the pilot's speed or thrust demand and various parameter measurements and governor limits etc and on line 63 to control fuel staging. Generally, the volume flow from pump 72 exceeds the requirement of the metering unit 74. In the present-arrangement the servo-supply 58 is tapped from the outlet of the pump 72, the servo requirement being easily absorbed by the flow excess, and the servo return is connected to the low pressure region in return path 69.

In operation the supply of fuel to the main burners 22 is controlled by pressure in the servo-manifold 54 acting directly on each of the servo-valves 16. This servo-pressure is governed by the valve 62 on the low-pressure return side of the manifold. When valve 62 is closed the pressure in the manifold 54 and in the valve servo-chambers 30 will rise to the output pressure of pump 72. With no flow in the servo-manifold the restrictor 56 has no effect and no pressure losses occur. All the servo-valves 16 will thus be actuated by pressure in chambers 30 acting on the pistons 34 to cut-off fuel flow from the manifold 12 to the main burners 22.

When valve 62 is opened and flow circulates in manifold 54 from the high pressure inlet 58 to the low pressure return 69 the flow restrictor 56 becomes effective and substantially the whole of the pressure drop occurs across the restrictor orifice. As a result the pressure in all of the servo-chambers 30 around the entire manifold system is substantially reduced. The bias force in the servo-valves is chosen to exceed this low pressure so all of the valves 16 switch-over and establish fuel flow to the main burners.

This manner of staging control can be achieved with a relatively low servo-manifold flow, determined by restrictor 56, so as not to rob the metering unit 74 of fuel flow. When staging is initiated by closing valve 62 manifold flow will cease, so that fuel is trapped in the manifold. However, if the servo-manifold is located around the outer wall of the combustor chamber and in bypass duct air the ambient temperature of its surroundings will almost certainly be too low for fuel coking to be a problem. Obviously conditions vary between engines and system dispositions. If desired a small flow could be maintained through the manifold, for example by arranging a bleed bypass to valve 62, which may allow the servo-manifold to be located in the chamber head, for example. In order to avoid a problem of fuel system hammer when staging is selected and deselected the valve 62 is preferably adapted for progressive operation, as opposed to snap operation. Alternatively the ports in the servo-valves 16 may be profiled to slug their response. The servo-valves 16 preferably utilise bias springs 50 having a relatively high spring force to overcome "sticktion" of the servo-pistons 34 and thereby improve reliability.

The invention is intended for use in fuel-staging systems but may be used in conjunction with the several types of staging in use, for example radial staging, axial staging or a combination of the two. Also the invention is not limited to the manner of grouping of the staged burners. Thus, although in the described embodiment the staged burners are grouped in pairs any other of the possible arrangements could be employed. So, for example, the staged or main burners may be arranged individually, or in groups of two, three or more burners, neither need burners controlled in groups be disposed adjacent to each other in the combustion chamber.

I claim:

1. A fuel system for a gas turbine engine, comprising:
   a multiplicity of fuel injector means,
   a fuel supply manifold with which all fuel injector means are in fuel supply communication, some of the fuel injector means being in free communication with the fuel supply manifold to receive fuel from a fuel supply system, and further ones of the fuel injector means being connected to the fuel supply manifold through a plurality of servo-operated valves selectively operable to supply fuel to the further ones of the fuel injector means for increased fuel burning,
   a servo-pressure manifold interconnecting said plurality of servo-operated valves, said servo-pressure manifold being arranged to carry a flow of fuel from a source of high pressure in the fuel supply system to a region of low pressure in the fuel supply system,
   restrictor means disposed upstream of the servo-pressure manifold to cause a substantial reduction in pressure of fuel flowing in the servo-pressure manifold, and
   a variable valve disposed downstream of the servo-pressure manifold to stem the flow of fuel in the servo-pressure manifold whereby to control pressure in the servo-pressure manifold to actuate the servo-operated valves.

2. A fuel system according to claim 1 wherein each of the servo-operated valves comprises a valve body having a servo-pressure chamber housing defining a servo-pressure chamber and a piston movable in response to high servo-pressure to stem fuel supply to the further ones of the fuel injector means.

3. A fuel system according to claim 2 wherein the piston is biased against pressure in the servo-pressure chamber.

4. A fuel system according to claim 2 wherein the piston comprises a first portion located within the servo-pressure chamber and a second portion located within a fuel supply chamber and movable, therein to interrupt flow between a fuel supply inlet in communication with the fuel supply manifold and an outlet in communication with the fuel injector means.

5. A fuel system as claimed in claim 1 wherein each one of the servo-operated valves is arranged to control fuel supply to a respective one of the further ones of the fuel injector means.

6. A fuel system as claimed in claim 5 wherein the further ones of the fuel injector means are grouped in pairs and fuel supply to each pair is controlled by a single servo-operated valve.

\* \* \* \* \*